Oct. 11, 1949.　　　　A. N. GRAY　　　　2,484,705
METHOD OF IMPROVING THE ADHERENCE
OF INSULATING COMPOUNDS TO METALS
AND PRODUCTS RESULTING THEREFROM
Filed Sept. 25, 1945
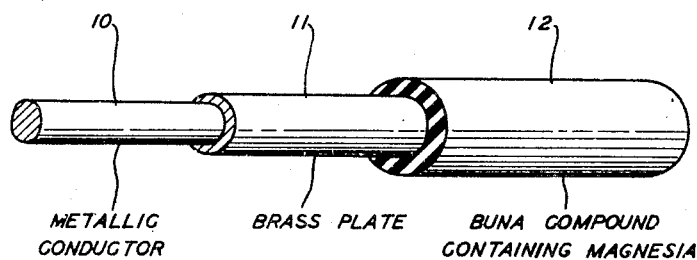
METALLIC　　　BRASS PLATE　　BUNA COMPOUND
CONDUCTOR　　　　　　　　　　CONTAINING MAGNESIA
INVENTOR
A.N. GRAY
BY
ATTORNEY Patented Oct. 11, 1949

2,484,705

UNITED STATES PATENT OFFICE 2,484,705

METHOD OF IMPROVING THE ADHERENCE OF INSULATING COMPOUNDS TO METALS AND PRODUCTS RESULTING THEREFROM

Alvin N. Gray, Joppa, Md., assignor to Western Electric Company, Incorporated, New York, N. Y., a corporation of New York Application September 25, 1945, Serial No. 618,552

12 Claims. (Cl. 117—128.7)

This invention relates to methods of improving the adherence of insulating compounds to metals and products resulting therefrom. The invention relates particularly to the production of composite products comprising metallic bodies having Buna compounds applied to surfaces thereof.

Insulating compounds containing synthetic, rubber-like materials have been used in large quantities in recent years as substitutes for insulating compounds containing rubber. Among the synthetic, rubber-like materials that have been used in such compounds are the so-called "Buna rubbers." While not true synthetic rubbers, they have many of the characteristics of natural rubber and may be vulcanized in much the same manner that natural rubber is vulcanized. The particular material of this type that has been employed most extensively in insulating compounds is that known as "Buna-S," which is a product resulting from the conjoint polymerization of butadiene and styrene and now is a well known article of commerce.

Buna-S may be compounded with vulcanizing agents, plasticizers, fillers and age and oxidation retarders, similar to those used in rubber compounds, to produce vulcanizable compounds suitable for use in insulating electrical conductors. Such compounds may be made to have acceptable tensile strength, compressive strength and insulating properties, but they possess the rather serious disadvantage of not adhering firmly to metals.

An object of this invention is to provide new and improved methods of improving the adherence of insulating compounds to metals and products resulting therefrom.

In accordance with the invention, improvement in the adherence of Buna compounds to metallic surfaces is accomplished by incorporating magnesia in the Buna compounds, placing the Buna compounds in contact with metallic surfaces and vulcanizing the compounds.

These and other objects and features of the invention will be apparent from the following detailed description of specific embodiments of the invention, and from the accompanying drawing. The single figure of the drawing is a fragmentary perspective view of one form of composite article embodying the invention, namely, an electrical conductor insulated with a Buna compound containing magnesia.

Example I

In this specific embodiment of the invention, a copper or bronze conductor illustrated by the conductor 10 in the drawing is coated with a layer of electroplated brass 11 to promote adhesion of a Buna insulating compound 12 thereto. The insulating compound is one in which Buna-S is the vulcanizable constituent, the particular Buna-S employed being that known in the trade as "GRS." This compound has the following approximate formula:

| | Per cent |
|---|---|
| GRS (Buna-S) | 37.0 |
| Extra light calcined magnesia | 1.0 |
| Zinc oxide | 33.0 |
| Sulphur | 1.5 |
| Accelerators, plasticizers, fillers, and age and oxidation inhibitors | Balance |

This compound is extruded over the brass plated conductor in a conventional manner and then is vulcanized in situ. The insulating compound may be applied to and vulcanized upon the conductor by suitable continuous extrusion and vulcanizing apparatus known to the art.

The vulcanized insulating compound adheres to the brass plated conductor with sufficient tenacity to meet commercial requirements and the adherence is substantially uniform from batch to batch of the compound. When a similar Buna-S compound containing no magnesia is employed in a substantially identical manner, the adherence of the compound to the conductor is much poorer and less uniform than is the case when magnesia is incorporated in the compound.

Example II

In this embodiment of the invention, a Buna-S insulating compound having the following approximate formula was employed:

| | Per cent |
|---|---|
| GRS (Buna-S) | 35.8 |
| Extra light calcined magnesia | 0.9 |
| Zinc oxide | 35.0 |
| Sulphur | 1.4 |
| Accelerators, plasticizers, fillers, and age and oxidation inhibitors | Balance |

This insulating compound is extruded and vulcanized over a brass plated conductor in the same manner as described in Example I. The adherence between the vulcanized compound and the conductor is very strong and uniform, whereas that obtained with a substantially identical Buna-S compound devoid of magnesia was relatively poor and non-uniform.

It will be noted that in both these compounds the magnesia, in round numbers, is about 2.5% of the Buna-S in the compounds. That is about 2.5 pounds of magnesia are included for each 100 pounds of Buna-S. This ratio has proved to be generally satisfactory for the usual Buna-S insulating compounds, although the relative proportions of these materials may be varied, if desired. Satisfactory results may be obtained with compounds in which the magnesia varies from about 1% to about 5% of the Buna-S in the compounds.

The reason why magnesia imparts increased adhesiveness to Buna compounds is not known and this property could not have been predicted from the prior art. Magnesia was used prior to the development of organic vulcanization accelerators to assist in the vulcanization of rubber compounds. It also has been used as a stabilizer for "neoprene" and for rubber hydrohalides. However, no prior use of magnesia in the art of compounding rubber or rubber-like plastics indicates that it would enhance the ability of vulcanized Buna compounds to adhere to metals, such as brass.

The conductors employed in the specific examples were brass plated in order to take advantage of the known ability of brass to improve the adhesion between metallic conductors and insulating compounds vulcanized with the use of sulphur. However, the adhesion to brass plated conductors obtained with Buna compounds containing magnesia is greater than that which results when brass is used as the sole adhesion-promoting agent.

The invention also is applicable to the insulation of conductors that have not been brass plated. For example, it may be practiced with copper or bronze conductors that have been hot tin dipped. Although the adhesion generally is not so great as is the case when the conductors are brass plated or hot tin dipped, nevertheless, vulcanized Buna compounds containing magnesia adhere better to uncoated conductors than do similar compounds that do not contain magnesia.

While the invention has been described as applied to the insulation of electrical conductors, it is obvious that other uses may be made of the invention. The features of the invention may be utilized wherever it is desired to cause a vulcanized Buna compound to adhere to a metallic surface, and particularly to copper alloy surfaced articles. Hence, the invention is not limited to the specific embodiments thereof disclosed hereinabove, but embraces all variations and modifications falling within the scope of the annexed claims.

What is claimed is:

1. The method of improving the adherence to bodies having at least one copper alloy surface of vulcanizable compounds in which the essential vulcanizable constituent is a copolymer of butadiene and styrene, which comprises incorporating magnesia in such a compound, placing a quantity of the magnesia-containing compound in contact with the copper alloy surface of such a body, and vulcanizing the latter compound while in contact with said surface, the amount of magnesia incorporated in said compound being sufficient to cause the compound to adhere to the metallic body with greater tenacity than would a similar compound devoid of magnesia but not more than about 5% of the amount of the copolymer present therein.

2. The method of improving the adherence to copper alloy surfaced articles of vulcanizable compounds in which the essential vulcanizable constituent is a copolymer of butadiene and styrene, which comprises incorporating magnesia in such a compound, forming a covering of the magnesia-containing compound upon the copper alloy surface of the article, and then vulcanizing the latter compound while in contact with said surface, the amount of magnesia incorporated in said compound being from about 1% to about 5% of the amount of the copolymer present therein.

3. The method of improving the adherence to brass surfaced conductors of vulcanizable insulating compounds in which the essential vulcanizable constituent is a copolymer of butadiene and styrene, which comprises incorporating magnesia in such a compound, forming a covering of the magnesia-containing compound upon such a conductor, and then vulcanizing the compound, the amount of magnesia incorporated in said compound being not more than 5% of the amount of the copolymer present therein and sufficient to cause the compound to adhere to the conductor with greater tenacity than would an otherwise identical compound devoid of magnesia.

4. The method of making insulated conductors, which comprises compounding a vulcanizable insulating compound in which the essential vulcanizable constituent is a copolymer of butadiene and styrene and which contains magnesia in an amount equal to from about 1% to about 5% of the copolymer present therein, extruding a covering of such compound upon a conductor at least the surface of which is composed of a copper alloy, and vulcanizing the compound on the conductor.

5. The method of making insulated conductors, which comprises compounding a vulcanizable insulating compound in which the essential vulcanizable constituent is a copolymer of butadiene and styrene and which contains magnesia in an amount equal to about 2.5% of the copolymer present therein, extruding a covering of such compound upon a brass plated conductor, and then vulcanizing the compound on the conductor.

6. The composite article resulting from vulcanizing in contact with a copper alloy surface a vulcanizable compound in which the essential vulcanizable constituent is a copolymer of butadiene and styrene and containing a sufficient amount of magnesia to cause the compound to adhere to the metallic body with greater tenacity than would a similar compound devoid of magnesia, the amount of magnesia present in said compound being not more than about 5% of the amount of the copolymer present therein.

7. A composite article, comprising a copper alloy surfaced body, and a layer of compound which has been vulcanized in contact with the copper alloy surface of said body, said compound prior to vulcanization having as its essential vulcanizable constituent a copolymer of butadiene and styrene and containing magnesia in an amount equal to from about 1% to about 5% of the amount of the copolymer therein, whereby the adherence of the vulcanized compound to the surface is enhanced.

8. An insulated conductor, comprising a filamentary brass surfaced conductor, and a covering vulcanized on the conductor, said covering consisting prior to vulcanization of a vulcanizable compound in which the essential vulcanizable constituent is a copolymer of butadiene and styrene and which contains magnesia in an amount equal to not more than 5% of the amount of copolymer present therein but sufficient to cause the compound to adhere to the conductor with greater tenacity than would an otherwise identical compound devoid of magnesia.

9. An insulated conductor, comprising a filamentary conductor at least the surface of which is composed of a copper alloy, and a covering extruded and vulcanized on the conductor, said covering consisting originally of a vulcanizable insulating compound in which the essential vulcanizable constituent is a copolymer of butadiene and styrene and containing an amount of magnesia equal to from about 1% to about 5% of the amount of the copolymer present therein.

10. An insulated conductor, comprising a filamentary brass plated conductor, and an extruded and vulcanized covering on the conductor, said covering prior to vulcanization consisting of an insulating compound in which the essential vulcanizable constituent is a copolymer of butadiene and styrene and which contains a quantity of a magnesia equal to about 2.5% of the amount of the copolymer in the compound.

11. The method of making insulated conductors, which comprises compounding a vulcanizable insulating compound in which the essential vulcanizable constituent is a copolymer of butadiene and styrene and which contains magnesia in an amount equal to from about 1% to about 5% of the copolymer present therein, extruding a covering of such a compound upon a brass plated conductor, and vulcanizing the compound on the conductor.

12. An insulated conductor, comprising a brass plated filamentary conductor, and a covering extruded and vulcanized on the conductor, said covering consisting prior to vulcanization of a vulcanizable insulating compound in which the essential vulcanizable constituent is a copolymer of butadiene and styrene and containing an amount of magnesia equal to from about 1% to about 5% of the amount of the copolymer present therein.

ALVIN N. GRAY.

REFERENCES CITED

The following references are of record in the file of this patent:

UNITED STATES PATENTS

| Number | Name | Date |
| --- | --- | --- |
| 2,135,886 | Elder | Nov. 8, 1938 |
| 2,259,350 | Merrill | Oct. 14, 1941 |
| 2,279,762 | Scott et al. | Apr. 14, 1942 |
| 2,376,854 | Saunders | May 22, 1945 |

OTHER REFERENCES

"The Compounding of Bunas," duPont Report No. 42–4 of December 1942, by Lawrence, page 9.

"Industrial and Engineering Chemistry," vol. 36 of 1944, pages 361–369.